428-408 SR

4/1/86 XR 4,579,611

United States Patent [19]

Broady

[11] Patent Number: 4,579,611

[45] Date of Patent: Apr. 1, 1986

[54] GRAPHITE TAMPED BRUSH CONNECTION AND METHOD OF MAKING SAME

[75] Inventor: Floyd J. Broady, Taylors, S.C.

[73] Assignee: Union Carbide Corporation, Danbury, Conn.

[21] Appl. No.: 562,563

[22] Filed: Dec. 19, 1983

[51] Int. Cl.[4] .......... C09J 5/00; G01F 1/00

[52] U.S. Cl. .......... 156/64; 29/826; 156/284; 156/293; 156/305; 156/325; 156/327; 252/506; 252/511; 310/249; 428/408

[58] Field of Search .......... 156/64, 325, 293, 327, 156/305, 284; 29/826; 428/408; 524/597; 252/506, 511; 310/249

[56] References Cited

U.S. PATENT DOCUMENTS

| | | | |
|---|---|---|---|
| 2,679,569 | 5/1954 | Hall | 252/506 |
| 3,510,710 | 5/1970 | McCafferty | 29/826 |
| 3,594,253 | 7/1971 | Froberg et al. | 156/325 |
| 4,075,524 | 2/1978 | Bradshaw et al. | 252/511 |

FOREIGN PATENT DOCUMENTS

| | | | |
|---|---|---|---|
| 857807 | 12/1970 | Canada | 252/511 |

*Primary Examiner*—John J. Gallagher
*Attorney, Agent, or Firm*—Frederick J. McCarthy, Jr.

[57] ABSTRACT

A connection between a graphite or carbon block having a cavity therein and the end of an electrical conductor disposed therein is made with a tamping material comprising flowable graphite powder, a metal oxide, a resin binder, and a flow promoter such a silica or a resin. The finished connection is treated with an acid dopant which reacts with the metal oxide to form a bond between the conductor and the block.

14 Claims, 2 Drawing Figures

GRAPHITE TAMPED BRUSH CONNECTION AND METHOD OF MAKING SAME

BACKGROUND OF THE INVENTION

Shunt connections which are usually of tamped variety, for current conducting carbon brushes of electrical rotating machinery are the weak point in the total system and often require premature brush replacement.

There is accordingly a need for improved tamped brush connections employing inexpensive materials and procedures and extensive research has been ongoing to this end over the years.

PRIOR ART DISCLOSURE

Prior art patents to which the subject invention relates are, U.S. Pat. Nos. 2,631,252; 3,510,710; 3,666,688; and 4,075,524.

The U.S. Pat. No. 2,631,252 disclosed a cable to brush connections made of discrete metallic particles tightly compacted around the cable and wherein each particle consists of a copper core protectively coated from oxidation by a coating metal of the group of silver, tin, cadmium, lead and nickel.

U.S. Pat. No. 3,510,710 discloses a tamping material for carbon brushes consisting of 85% to 97% by weight of silver coated graphite particles and 15% to 3% by weight of a resin binder such as phenolic resin.

U.S. Pat. No. 3,666,688 describes a tamping material for securing connections to carbon blocks comprising granules of graphite and a resin binder of a size ranging from −20 mesh to +115 mesh.

U.S. Pat. No. 4,075,524 describes a tamping composition comprising granules formed as in the previous patent but with a polysulfone resin being used as the binder.

OBJECTS AND SUMMARY OF THE INVENTION

It is an important object of the present invention to provide a tamped connection for carbon brushes and the like possessing improved performance characteristics.

An equally important object of the invention is to provide a connection of the character described from inexpensive materials such as scrap graphite.

It is a further object of the invention to provide a carbon brush connection and a method for making same wherein the tamped interconnection between the cable and the brush is so effectuated as to provide a durable high strength and low resistance connection characterized by a very low probability of service failure and where interface resistances remain stable through a wide range of temperatures and adverse conditions. These and other objects, features and advantages of this invention are achieved by the use of a flowable tamping material comprising finely divided graphite, a metal oxide, a resin binder and a flow promoter, more particularly, a composition, by weight, about:

| | Parts by Weight |
|---|---|
| graphite (mesh size) −48 to +325 | 50 |
| metal oxide | 50 |
| thermosetting/thermoplastic resin binder | 2.5 |
| graphite flow promoter | 0.5 |

Optimum connection strength and electrical properties are obtained with a 50—50 mixture of graphite and copper oxide (CuO).

In its method aspect, the invention comprises the steps of blending the resin, graphite flow promoter, graphite, and metal oxide with a liquid; drying the mixture; granulating the dried mixture to a mesh size of from −35 to +600 mesh; testing for flowability of the granulated material; providing a cavity in a carbon block, forming a connection in the cavity; tamping said material therein; doping the connection so made with an acid solution optionally containing a wetting agent and drying the assembly, preferably between 90° and 100° C.

DISCLOSURE OF BEST MODE

Figure 1:
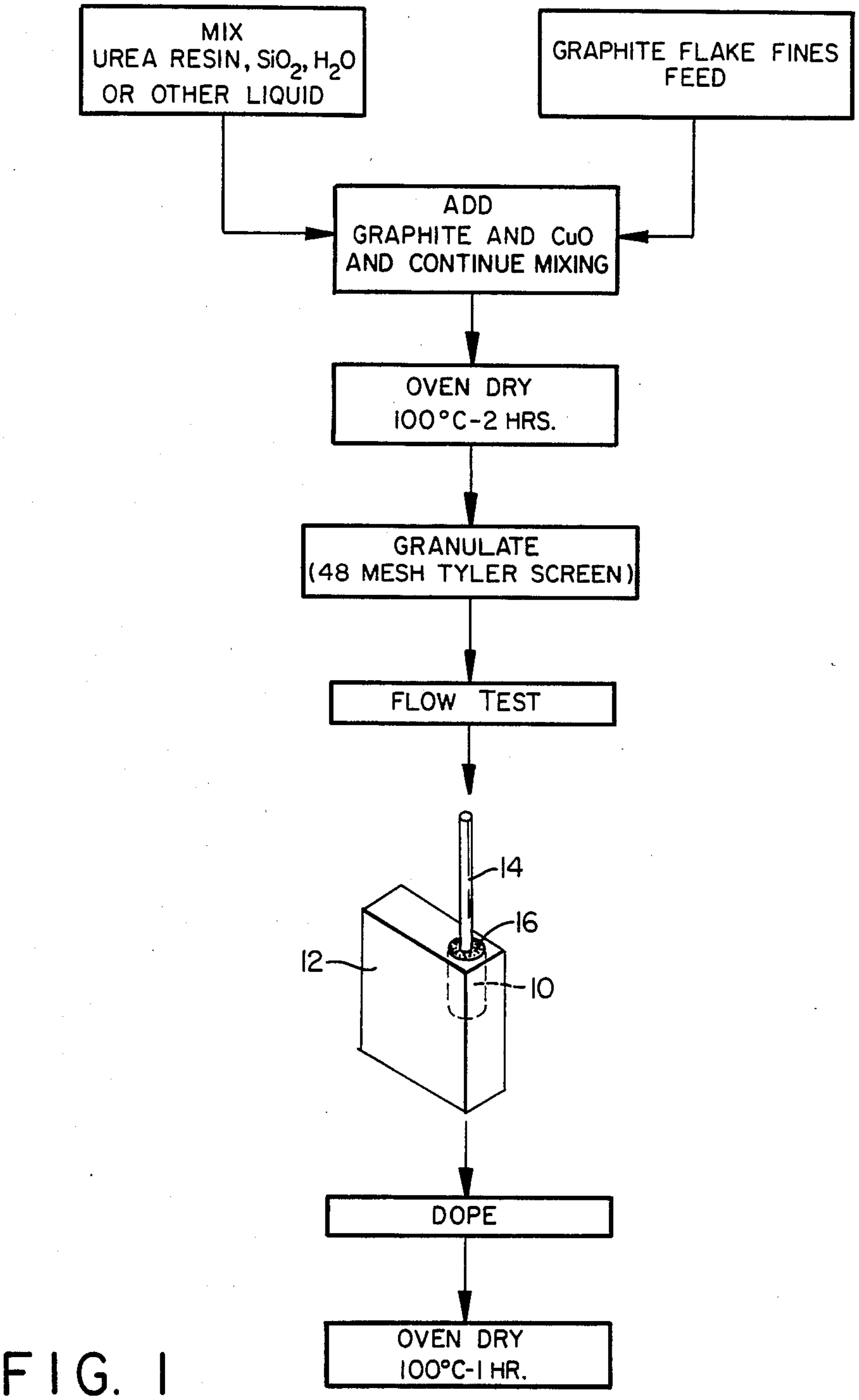
FIG. 1 is a flow diagram illustrating the method of the invention in its preferred form ending in a perspective view of a brush employing the tamped brush connection of the invention and FIG. 2 is a graph showing the the screen analysis of the mixture. All screen sizes in this specification are Tyler Sieve Series unless otherwise designated.

In the practice of the invention, it is important to use graphite flakes which are flowable. Such flakes have a mesh size range of between 70 and 325 and, preferably are of natural graphite such as Madagascar flake fines.

The metal oxide is preferably cupric oxide (CuO) thru 325 mesh, but oxides of silver, tin, cadmium, lead or nickel may be used. Various thermosetting and thermoplastic resins can be used including polysulfone resins, epoxy resins, phenol formaldehyde resins, phenolic resins and urea resins. Various flow promoters are suitable but silica such as "Cabosil" is preferred. Various resins can be used for this purpose, also, various liquids including water, alcohols, or other liquid solvents can be used to mix the resin with the flow promoter.

To dope the tamping material various acids (acetic, citric, phosphoric or mixtures thereof) can be used. The preferred doping material is an equal mixture of $CH_3COOH$ and $H_3PO_4$ with a wetting agent and water. Broadly this mixture will contain:

| | Parts by weight from |
|---|---|
| $CH_3COOH$ | 75 to 125 |
| $H_3PO_4$ | 75 to 125 |
| $H_2O$ | 8 to 12 |
| Wetting agent | 0.5 to 1.5 |

The preferred mixture contains in part by weight

| | |
|---|---|
| $CH_3COOH$ | 100 |
| $H_3PO_4$ | 100 |
| $H_2O$ | 10 |
| Wetting Agent ("Tergitol" - sodium alkyl sulfates) | 1 |

Most preferably the present formulations consist of:

(1) Madagascar Graphite (2) Cupric Oxide—which performs a three-fold role (a) to densify the mixture and thereby promote a faster flow, (b) to act as a thermosetting cement when reacted with acid during the doping step and (c) to provide visibility to the connection during X-ray examination.

(3) "Cabosil"—a finely divided thixotropic silica material that acts as a binder to bond the graphite and the oxide into a homogeneous mixture that resists segregation.

(4) Urea resin—an agent used to further promote flow.

EXAMPLE

In a typical example the following ingredients were provided for a batch of tamping compound.

| Ingredients | Grams | Pounds |
|---|---|---|
| (a) Graphite - (<)48 mesh | 9088 | 20 |
| (b) CuO | 9088 | 20 |
| (c) Urea Resin ("Kaurit S") | 454 | 1 |
| (d) $SiO_2$ ("Cabosil") | 90 | 0.2 |
| (e) $H_2O$ | 2726 | 6 |

The "Kaurit S," "Cabosil," and water were combined in a clean bowl of a Hobart Mixer and mixed for a minimum of ten minutes; the graphite was slowly added and mixed at a low speed for five minutes, and a slightly higher speed for an additional ten minutes; copper oxide was added and mixed at a low speed for five minutes and at a slightly higher speed for an additional ten minutes; the mix was then removed from the bowl and put into conventional cake pans. The pans were filled to a depth of 1 to 1½ inches; the pans were placed in an oven at a temperature of 90° C. and drying continued for minimum of five hours at 90° C.; finally the dried mixture was introduced into a "Stokes Granulator" provided with a 48 mesh screen.

To readily achieve this, set a suitable container with plastic liner under granulator and scoop the dried tamping mix into granulator opening. Cover opening and turn on granulator. Continue to operate until all of the mix has passed through the screen. Repeat process until all of the pans from above step has been emptied. Discard plus 48 mesh portion.

Using a thief sampler obtain a 200 gram sample for screen analysis flow and density tests.

Place desiccant bag on top of powder and seal plastic liner. To determine the density of the above made mixture proceed as follows:

Weigh empty 25 cc cylinder; record weight.

Overfill 25 cc cylinder with above powder.

Using a straight edge, level the powder with the top of the cylinder.

Weigh filled 25 cc cylinder; record weight;

Weight of Filled cylinder—Weight of Empty Cylinder÷25=density gms/cc

Limits of 0.80–1.15 gms/cc are suitable for the purposes of this invention.

To determine the flowability of the tamping mixture proceed as follows:

Use filled cylinder from the density test for flow test.

Place finger over hole at bottom of funnel (Hall flow meter) and pour the cylinder of powder into the opening. Prepare to activate stopwatch.

Release powder from funnel by removing finger and start the stopwatch simultaneously.

If powder fails to flow; reset stopwatch; tap funnel lightly to facilitate flow and again start stopwatch.

If continued tapping of funnel is necessary to maintain flow, discontinue test.

Add approximately 0.1% of "Cabosil" to the 25 cc cylinder of powder; shake well to disburse the "Cabosil" and repeat flow test.

Limits—50–65 seconds. If speed is not within these limits add 0.1% Cabosil to that specific batch and reblend.

To effect screen analysis of the above mixture weigh 100 grams of tamping powder.

Clean Tyler Screen series consisting of 50,100,140,200, 325 meshes and pan.

Place the above 100 gram sample on top of a (50 mesh) screen.

Place assembled screen series on Rotap shaker. Set timer for 5 minutes. Activate shaker.

Remove screen assembly from shaker, disassemble and weight each powder fraction.

For limits—consult graph (FIG. 2) to ascertain whether sample falls within limits prescribed for each fraction.

In the preferred embodiment of the invention, the doping solution water is mixed with the wetting agent, acetic acid is added and then phosphoric acid. Blending is carried out until a clear solution is obtained. Standard doping procedures are maintained using the proper amount of drops as tabulated below in the Table.

TABLE

| Cable Size | *Standard Hole Depth | No. Impacts by Counter | Dope No. of Drops |
|---|---|---|---|
| 7-9-005 | ¼ | 7–12 | 2 |
| 7-15-005 | 11/32 | 9–14 | 2 |
| 7-24-005 | ⅜ | 9/14 | 3 |
| 7-37-005 | ½ | 11–16 | 3 |
| 7-59-005 | 19/32 | 13–18 | 4 |
| 7-75-005 | 11/16 | 14–19 | 4 |
| 7-95-005 | ¾ | 15–20 | 4 |
| 7-119-005 | ¾ | 15–20 | 4 |
| 7-150-005 | ¾ | 15–20 | 4 |

*In the cable size code the first number is the number of bundles in the cable, the second number is the number of strands in a bundle and, the third number is the diameter of the wire in inches. Thus the first cable in the Table is seven bundles of .005 mesh wire with nine strands to the bundle.

DETAILED DESCRIPTION OF THE DRAWINGS

Figure 2:
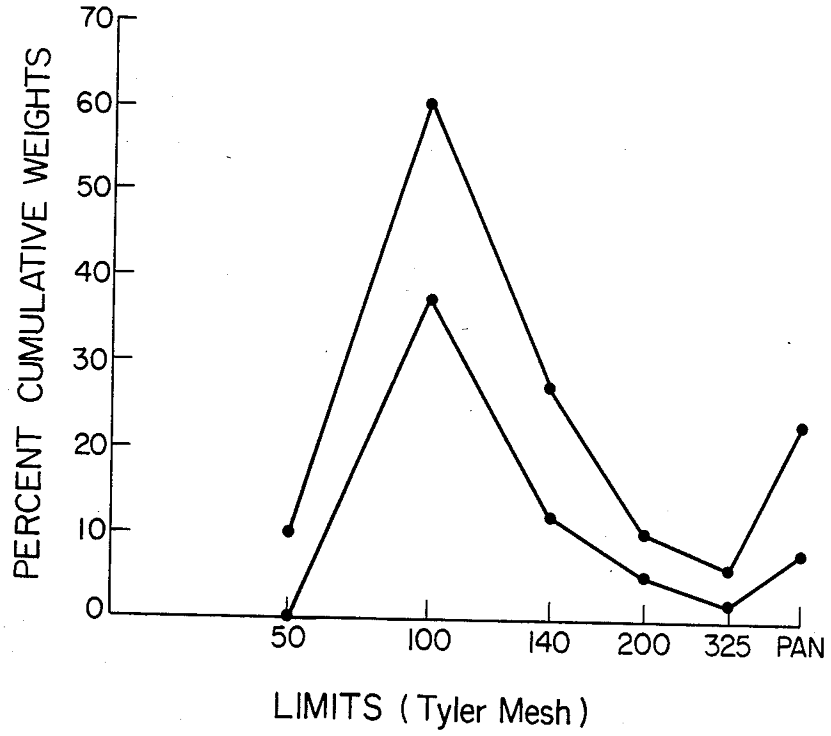

To provide a brush connection as shown at the bottom of FIG. 1, a cavity 10 was drilled in carbon brush 12. Cable 14 was inserted in the cavity and the tamping mixture 16 of the invention tamped in. The required number of drops of the doping solution was applied with a doping needle. The assembly was placed in an oven for one hour in air at 100° C. and cured. The flow diagram of FIG. 1 and the graph of FIG. 2 are self-explanatory from a reading of the specification.

Thus formed connectors passed the conventional tests. In the heat-vibration test the connectors of the invention were still intact after 6½ hours while standard connectors were broken after ½ hour.

It has been shown that graphite tamped connection of this invention:

(a) Endures higher operating temperatures than the standard tamped brush connections, as shown by results of current overload tests.

(b) Endures a vibration and heating in the "shake and bake" test—no pull-outs or shake-outs for doped graphite tamped connections.

(c) The graphite tamping mix contains cupric oxide, which makes X-ray inspection of the tamped connection possible, as without the presence of an X-ray opaque material such inspection is not possible.

(d) The graphite used is of the kind which is otherwise scrapped and replaces copper powder, which is a costly material, so the process has economic benefit.

What is claimed is:

1. A method for connecting an electrical conductor to a carbon block having a cavity, the diameter of said cavity being greater than the diameter of said conductor, comprising blending a resin, silica, graphite, and a metal oxide with a liquid; drying and milling the mixture to a Tyler mesh size of −35 to +600; inserting an end of said conductor into said cavity; tamping the dried milled mixture around the conductor in the cavity; and doping the mixture with an acid solution to cure the assembly.

2. The method of claim 1 which includes the step of testing the flowability of said mixture before the mixture is tamped into said cavity.

3. The method of claim 1 wherein said metal oxide is selected from the group consisting of cupric oxide, siliver oxide, tin oxide, cadmium oxide, lead oxide, and nickel oxide.

4. The method of claim 1 wherein said acid solution contains a wetting agent.

5. The method of claim 1 wherein said acid solution contains acetic acid and phosphoric acid.

6. The method of claim 1 wherein said acid solution contains citric acid.

7. A tamping composition for securing electrical connections comprising a dry mixture of finely divided particles of graphite, silica, a metal oxide, and a resin.

8. The composition of claim 7 wherein said metal oxide is selected from the group consisting of cupric oxide, siliver oxide, tin oxide, cadmium oxide, lead oxide, and nickel oxide.

9. The composition of claim 7 wherein said graphite has a Tyler mesh size of −48 to +325.

10. The composition of claim 7, 8, or 9 wherein said mixture has a Tyler mesh size of −35 to +600 and a density of from 0.80 to 1.15 g/cc.

11. A tamping composition for securing electrical connections comprising a dry mixture of finely divided particles of graphite, silica, cupric oxide, and a resin, said graphite having a Tyler mesh size of −48 to +325, said mixture having a Tyler mesh size of −35 to +600 and a density of from 0.80 to 1.15 g/cc.

12. The composition of claim 11 wherein said graphite and said cupric oxide are present in equal amounts by weight.

13. A tamping composition for securing electrical connections comprising a finely divided mixture of, by weight, 20 parts −48 Tyler mesh graphite, 20 parts cupric oxide, 1 part urea resin, and 0.2 parts silica.

14. In combination, a carbon block having a cavity therein; an electrical conductor having an end portion disposed in said cavity, said conductor being secured therein by the composition of claim 7, 8, 11 or 13 and an acid dopant.

* * * * *